July 5, 1960  E. E. REED ET AL  2,943,636
FLUID HANDLING STRUCTURE

Filed Dec. 16, 1957  3 Sheets-Sheet 1

INVENTORS
H.E. LA RUE
E.E. REED
BY
ATTORNEYS

INVENTORS
H.E. LA RUE
E.E. REED

BY

ATTORNEYS

United States Patent Office 2,943,636
Patented July 5, 1960

2,943,636

FLUID HANDLING STRUCTURE

Edwin E. Reed and Harold E. La Rue, Bartlesville, Okla., assignors to Phillips Petroleum Company, a corporation of Delaware Filed Dec. 16, 1957, Ser. No. 703,088

15 Claims. (Cl. 137—220)

This invention relates to a fluid handling structure. In one aspect this invention relates to a hydrant valve structure adapted to automatically close when flow therethrough reaches a predetermined maximum. In another aspect this invention relates to a hydrant structure adapted to permit flow therethrough in either direction.

At the present time, there is a trend to replace the familiar aircraft servicing tank truck with a fueling system comprising underground conduits supplying fuel from a central storage and pumping facility to a plurality of fuel hydrants located at parking stations on the air field. In such a fueling system small mobil servicing trucks, having metering and filtering means thereon and provided with suitable connections which connect with said fuel hydrant and the aircraft, are employed at said parking stations. The fuel is delivered from the hydrant through said metering and filtering means on the service truck and then into the aircraft. In most instances both the truck conduit connecting to the hydrant and the hydrant outlet itself are provided with valves which close automatically when said truck conduit and said hydrant are separated. Although said servicing truck is generally provided with emergency shutdown means, it is desirable that means be provided to shut off flow at the hydrant under emergency conditions. It is also desirable that the hydrant valve be adapted to permit flow in either direction so as to accommodate both fueling and defueling operations.

An object of this invention is to provide an improved fluid handling structure. Another object of this invention is to provide an improved fluid handling structure having a valve therein adapted to be closed by an excessive pressure drop through said structure. Another object of this invention is to provide an improved fluid handling structure having a valve therein adapted to be operated by the pressure of the fluid flowing through said structure regardless of the direction in which said fluid is flowing. Still another object of this invention is to provide a fluid handling structure having a piston valve therein adapted to be opened by the pressure of the fluid flowing in one direction when a pilot valve is opened; said piston valve having a recess forming an undercut shoulder in the wall thereof adapted to cause it to open responsive to the pressure of fluid flowing in the other direction. Another object of this invention is to provide a hydrant valve particularly adapted to be employed in a hydrant fueling system for the fueling and defueling of aircraft. Another object of this invention is to provide a hydrant valve adapted to be employed in aircraft fueling operations and provided with emergency shutdown means. Other aspects, objects, and advantages of the invention will be apparent to those skilled in the art in view of this disclosure.

Figure 1:
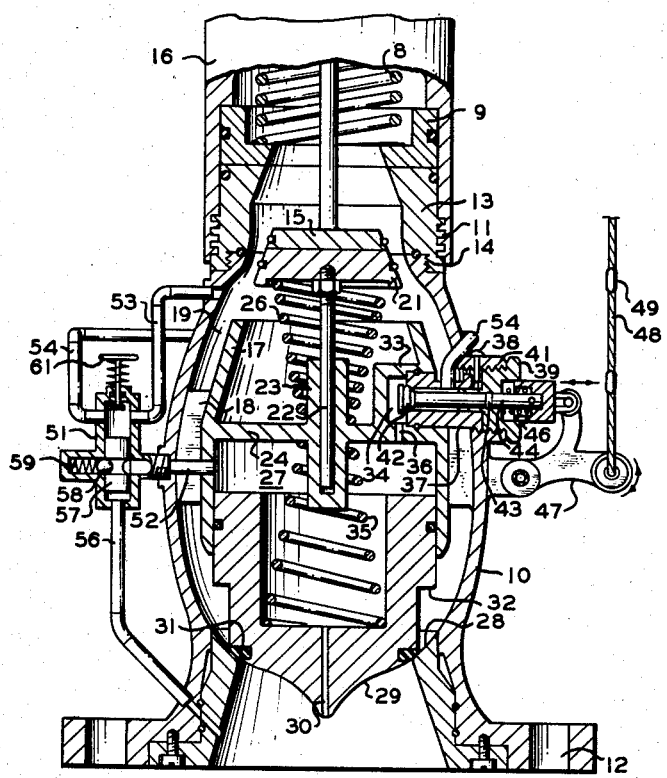
Figure 1 is a vertical cross section of one modification of the fluid handling structure of the invention adapted to permit flow therethrough in either direction and provided with excess flow means.

Referring now to the drawings, the invention will be more fully explained by describing a modification thereof which is particularly adapted to be employed as a hydrant valve in a hydrant system for fueling and defueling of aircraft. The modification illustrated in Figure 1 comprises a tubular housing 10 having its opposite ends adapted to be connected with fluid handling conduits as by threads 11 at one end (threaded end) and flange 12 at the other end (flanged end). Inwardly facing valve seat 13 is provided at one end of said housing and attached thereto by means of threads 14. It will be noted that in effect said valve seat 13 is a part of said housing 10 and carries the threads 11 by means of which said housing 10 is connected to a mating coupling 16. A baffle structure 17 is supported within said housing 10 by means of supports 18 intermediate the ends of said housing in such a manner as to provide an annular space 19 between said baffle structure and the inner wall of said housing. Poppet valve 21 having valve stem 22 attached thereto seats in said valve seat 13. Said valve stem 22 is slidably supported in a guideway 23 which in turn is supported by a wall member 24 extending transversely internally of said baffle structure. Spring 26 surrounding said guideway 23 and valve stem 22 provides means for biasing said poppet valve 21 to a normally closed position. Said poppet valve 21 is biased to open position by valve 15 in mating coupling 16 when said mating coupling is coupled with housing 10. Valve 15 is fixed (not shown) within mating coupling 16 and valve seat 9 is adapted to be moved upward and away from valve 15 by contact with valve seat 13 as mating coupling 16 is threaded onto housing 10. When mating coupling 16 is removed from housing 10 spring 8 forces valve seat 9 downward into engagement with valve 15. Any suitable type of mating coupling having a "dry-break" poppet valve therein which is adapted to be opened itself and to open poppet valve 21 when said coupling and said housing are coupled together can be employed with the fluid handling structure of the invention.

Said wall member 24, together with one end of said baffle structure, defines a piston chamber 27 within said baffle structure and adjacent an internal shoulder 28 at the other end of said housing 10, i.e., opposite said valve seat 13. A piston valve 29 is slidably engaged in said piston chamber and is adapted in an extended position to seat against said shoulder 28. Spring 35 bearing against wall member is adapted to bias piston 29 to seating position against shoulder 28. Resilient seat 31 which can be made of any suitable resilient material, here indicated to be a rubber-like material, can be employed as a valve seat on the end of said piston valve to form a seal with said shoulder 28. It will be noted that the wall of said piston valve 29 is recessed to provide an undercut shoulder 32 therein. A port or conduit means 30 provides communication between said piston chamber and the interior of said housing.

A second wall member 33, together with said first wall member 24, defines a valve chamber 34 within the end of said baffle structure 17 which is adjacent said valve seat 13. A port 36 in wall member 24 provides communication between said piston chamber 27 and said valve chamber 34. A valve body 37 extends through the wall of housing 10, through said annular space 19 and into said valve chamber 34. Set screw 38 serves to secure said valve body in position. Valve body cap 39, threadably engaged in inlet 41, seals said valve body in said housing 10. A starter valve 42 is disposed within said valve body and seats at the inner end thereof. O-ring 43 on valve stem 44 provides a seal between said valve stem 43 and valve body cap 39. As shown, said valve stem 44 is slidably engaged in said valve cap 39 and starter valve 42 is adapted to be biased to a normally closed position by means of spring 46 and to be actuated by means of pivotally connected lever member 47. A lanyard 48, having fusible rings 49 therein is attached to said lever 47 and provides means for operation from a remote position.

A cylinder 51 is provided without and adjacent said housing 10 and is connected to said housing at an intermediate point thereof by means of a first conduit 52 which extends to and provides communication between said cylinder 51 and piston chamber 27. A second conduit 53 is connected to and provides communication between one end of said cylinder and the end of said housing 10 which is adjacent valve seat 13. A third conduit 54 is connected to said one end of said cylinder 51, extends to, and is connected with a port in valve body 37. A fourth conduit 56 is connected to and extends from the other end of said cylinder 51 to a point within said housing 10 outside of said internal shoulder 28. A plug 57 is slidably disposed within said cylinder 51 and is adapted in normal position to prevent flow through said first conduit 52 and said fourth conduit 56, and to permit flow through said second conduit 53 and said third conduit 54. Ball 58, biased by spring 59, co-acts with a detent in plug 57 to hold said plug in said normal position. Said spring 59 is adapted, responsive to a predetermined maximum pressure drop between flanged end 12 and threaded end 11 of housing 10, to release plug 57 from said normal position whereupon said plug will slide within said cylinder and block flow through said second conduit 53 and said third conduit 54, and permit flow through said first conduit 52 and said fourth conduit 56. Spring biased plunger 61 is provided to re-set plug 57 at its normal position.

Figure 2:
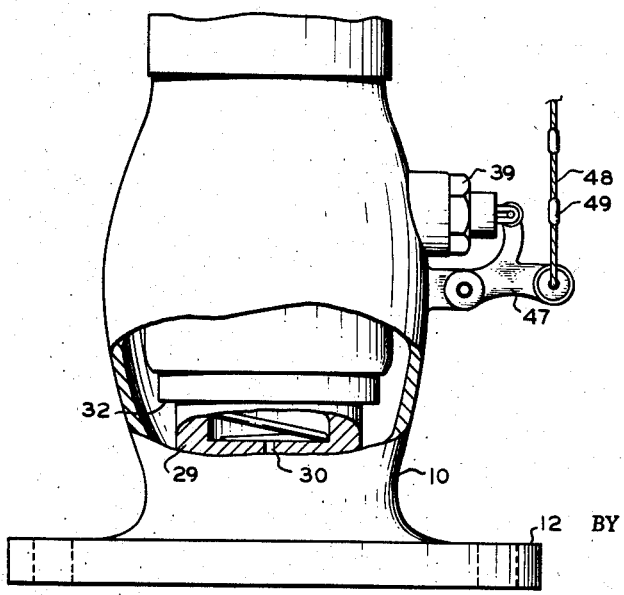
Figure 2 is an illustration of one modification of the fluid handling structure of the invention adapted to permit flow in either direction.

The fluid handling structure illustrated in Figure 2 is also provided with a piston 29 having an undercut shoulder 32 therein and is thus adapted to permit fluid flow therethrough in either direction in the same manner as the fluid handling structure illustrated in Figure 1. However, the excess flow device comprising cylinder 51, which in Figure 1 prevents excess flow in a direction from flanged end 12 toward threaded end 11 through said housing 10 has been omitted from the fluid handling structure illustrated in Figure 2. When said excess flow device is omitted, conduit 54 connected to valve body 37 and cylinder 51 is of course also omitted and the passage through said valve body 37 which provides communication between piston chamber 27 (via valve chamber 34) and annular space 19, opens directly into annular space 19.

Figure 3:
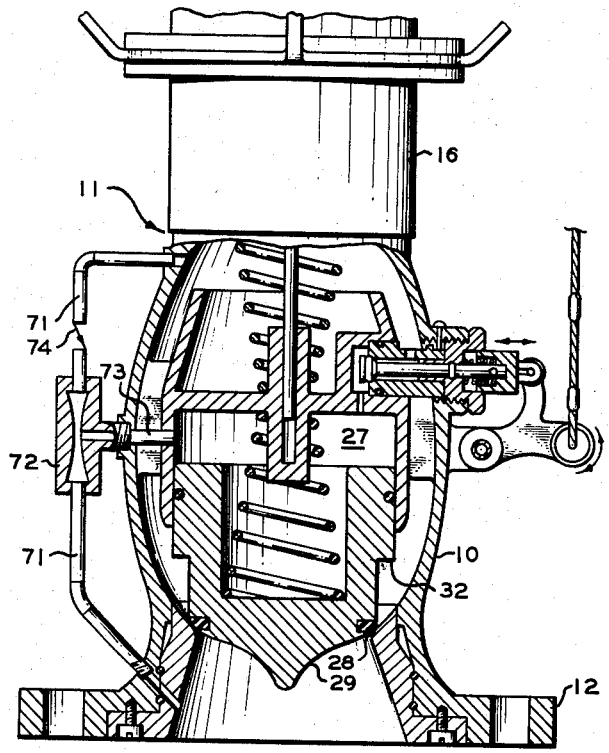
Figure 3 illustrates another modification of the fluid handling structure of the invention which is provided with a venturi device employed to co-act with the undercut shoulder on the piston valve to aid in opening said piston valve on defueling operations.

In the fluid handling structure illustrated in Figure 3 said excess flow means comprising cylinder 51 has been omitted as in Figure 2. In Figure 3 conduit 71 having venturi 72 disposed therein is connected at one end to said housing at a point adjacent said threaded end 11 and is connected to said housing at the other end at a point between said internal shoulder 28 and flanged end 12. A conduit 73 is connected to the throat of said venturi and piston chamber 27. A check valve 74 is provided in said conduit 71 between said venturi 72 and said threaded end 11 of houing 10. Said check valve is adapted to permit one way flow only in a direction from threaded end 11 toward flanged end 12 of housing 10. It will be noted that port 30 in piston valve 29 has been omitted because conduit 71, venturi 72, and conduit 73 serve the same function as port 30. Of course, however, the piston valve of Figure 1 having port 30 therein can also be employed in the fluid handling structure of Figure 3.

Although the excess flow device comprising cylinder 51, as illustrated in Figure 1, has not been illustrated as being employed in connection with the fluid handling structure of Figure 3, it is within the scope of the invention to provide a fluid handling structure equipped with both the excess flow device of Figure 1 and the venturi device of Figure 3.

Figure 5:
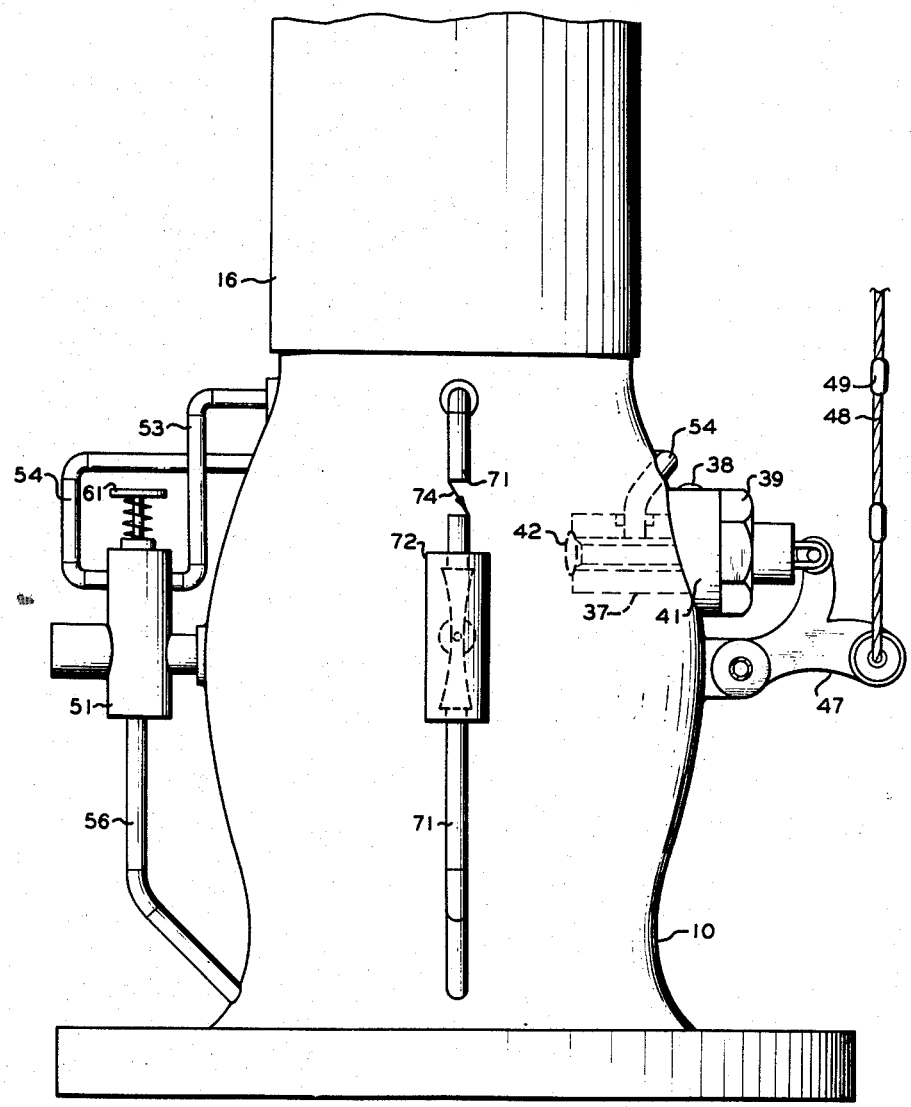
Figure 5 illustrates another modification of the fluid handling structure of the invention which is provided with both said venturi device and said excess flow means.

Figure 5 illustrates such a fluid handling structure. In Figure 5, conduit 71 with its associated elements as in Figure 3, is illustrated in elevation on the "front" of housing 10. Said conduit 71 and associated elements are connected to housing 10 in the same manner as in Figure 3. Obviously, any relative positions of conduit 71 and associated elements, and the excess flow device comprising cylinder 51, around housing 10 can be employed. For example, conduit 71 and its associated elements could be opposite starter valve 42 and the excess flow device comprising cylinder 51 could be on the "front" of housing 10. In Figure 5, said excess flow device comprising cylinder 51 is connected into housing 10 in the same manner as illustrated in Figure 1.

Figure 4:
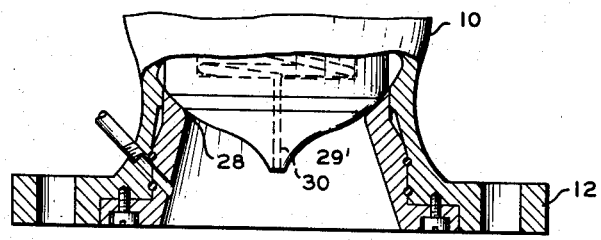
Figure 4 is an illustration of another type piston valve which can be employed in the modification of the invention shown in Figure 1 when fluid flow in one direction only is contemplated.

Figure 4 illustrates another type of piston valve 29' which can be employed in the apparatus of Figure 1 in place of piston valve 29 there illustrated. It will be noted that piston valve 29' does not have a recess in the wall thereof to provide an undercut shoulder. Thus piston valve 29', is adapted for use only when fluid flow in one direction only is contemplated.

In operation of the apparatus illustrated in Figure 1, assuming that mating coupling 16 has been coupled to housing 10, and poppet valve 21 is biased to an open position by poppet valve 15 as shown, opening of valve 42 by lifting lever means 47 will permit flow through port 30 into piston chamber 27, through port 36 into valve chamber 34, then through valve body 37, conduit 54, the upper end of cylinder 51, and conduit 53 into housing 10. With the opening of valve 42 establishing communication as described, the pressure within piston chamber 27 is reduced and pressure exerted by the flowing fluid against the end of piston valve 29 overcomes the action of spring 35 and causes said piston valve to be moved upwardly from its seat at shoulder 28, thus permitting flow through annular space 19 and the opening provided by valve seat 13. In this manner fuel can be supplied to an aircraft. Said flow will continue so long as starter valve 42 is open. If for any reason an emergency arises and it is necessary to stop flow as soon as possible, release of lever 47 will cause starter valve 42 to be closed, whereupon pressure builds up within piston chamber 27, the pressures on either side of piston 29 are balanced, and said piston 29 is caused to seat at shoulder 28 by the action of spring 35, causing flow to stop. Fusible link 49 in lanyard 48 is adapted to melt and part in the event of a fire which would automatically cause starter valve 42 to close.

If during said fueling operation the flow through housing 10 becomes excessive, which will cause an excessive pressure drop between flanged end 12 and threaded end 11 of said housing, said excessive pressure drop will be exerted on plug 57 via conduit 56 and cause said plug to move in cylinder 51 so as to block conduits 53 and 54 and in effect close starter valve 42. When plug 57 moves, it opens conduit 52 permitting stream pressure to enter piston chamber 27 and piston 29 will be closed by the action of spring 35. After normal conditions have been restored, plunger 61 can be employed to re-set plug 57.

Assume now that it is desired to defuel an aircraft and connections have been made as previously described. In the defueling operation flow will be from threaded end 11 to flanged end 12 of said housing 10. Said flow will be around baffle structure 17 through annular space 19 and will be exerted against undercut shoulder 32 thus causing piston valve 29 to move away from shoulder 28 and open which will permit defueling operation. It should be noted that the piston valve 29' of Figure 4 is not provided with undercut shoulder 32 and thus there is no surface upon which fluid pressure acts to open piston valve 29 in defueling operations. Thus piston valve 29' is adapted for one way flow only.

The venturi device of Figure 3 is provided as an aid in the opening of piston valve 29 in defueling operations. When said venturi device is employed, piston valve 29 will tend to open regardless, due to the action of fluid pressure on undercut shoulder 32 as previously described; however, the flow of fluid through the throat of venturi 72 reduces the pressure in conduit 73 and piston chamber 27 in known manner and thus aids the force acting against shoulder 32 in opening piston valve 29.

The operation of the fluid handling structure illustrated in Figure 5, which is provided with both the venturi device of Figure 3 comprising conduits 71 and its associated elements, and the excess flow device of Figure 1 comprising cylinder 51, will be obvious in view of the above description of the operation of the modifications of the invention illustrated in said Figures 1 and 3.

It is believed that the advantages of the invention will be apparent to those skilled in the art in view of the above detailed description. The invention provides a fluid handling structure which can be employed in a conduit, such as a fueling and defueling conduit, to control flow in either direction. The fluid handling structure of the invention is compact in that it can be incorporated in a structure of 12 inches in length or less depending upon the volume of flow desired. It is believed evident the structure can be readily installed and easily maintained. The emergency shutdown feature provided by starter control valve 42 is another important advantage of the fluid handling structure of the invention. For example, after fueling operations have been started one can secure lanyard 48 in a taut position to hold starter valve 42 open and then absent himself from the vicinity of the hydrant valve. In the event of a fire, fusible ring 49 would part and fueling operations would be automatically shut down. Another important advantage of the invention is that the valving actions are fast acting. It is only a matter of seconds, even at high flows, before the valves are closed.

While the invention has been described in terms of a hydrant valve adapted for use in fueling and defueling of aircraft the invention is not limited to such use.

Various modifications of the invention will be apparent to those skilled in the art in view of the above disclosure. Such modifications are within the spirit and scope of the invention.

We claim:

1. A fluid handling structure comprising: a tubular housing with a first end serving at least as an inlet and an opposite second end serving at least as an outlet, said ends being operable to be connected with fluid handling conduits; a baffle structure supported within said housing intermediate said ends so as to form an annular space between said baffle structure and said housing; a poppet valve supported by said baffle structure and seatable in a valve seat at said second end of said housing; a piston valve having a wall slidably engaged in a piston chamber formed within the end portion of said baffle structure which is adjacent said first end of said housing and seatable against an internal shoulder on the inner wall of said housing and adjacent said first end of said housing; a starter valve in a valve body which extends into a valve chamber formed by wall means within the other end portion of said baffle structure which is adjacent said poppet valve and said second end of said housing; means for biasing said starter valve to a closed position; first conduit means, including said starter valve and a passageway connecting said piston chamber with a region within said housing between said internal shoulder and said first end of said housing, for providing communication via said piston chamber between said ends of said housing, said starter valve blocking said first conduit means until opened; means for opening said starter valve so as to provide said communication; and excess flow means without said housing, operatively connected to said region within said housing, said piston chamber, and a second region adjacent said second end and operable to stop fluid flow at a predetermined maximum pressure drop between said first and said second ends of said housing.

2. A fluid handling structure according to claim 1 wherein said wall of said piston valve is recessed at a point intermediate its ends to provide a shoulder therein.

3. A fluid handling structure according to claim 2 wherein: a conduit is operatively connected at one end to said housing at a point adjacent said valve seat and at the other end to said housing at a point between said internal shoulder and said first end of said housing; a venturi is disposed in said conduit; a check valve, operable to enable flow through said conduit from said one end to said other end only, is disposed in said conduit between said venturi and said one end of said conduit; and another conduit connects the throat of said venturi with said piston chamber.

4. A fluid handling structure operable to enable flow therethrough in opposite directions at different times, which structure comprises: a tubular housing with a first end serving at least as an inlet and an opposite second end serving at least as an outlet, said ends being operable to be connected with fluid handling conduits; a baffle structure supported within said housing intermediate said ends so as to form an annular space between said baffle structure and said housing; a mechanically operated poppet valve supported by said baffle structure and seatable in a valve seat at said second end of said housing; spring means for biasing said poppet valve to seating position in said valve seat; a fluid operated piston valve slidably engaged in a piston chamber formed within the end portion of said baffle structure which is adjacent said first end of said housing and operable in one position with one extended end to seat against an internal shoulder on the inner wall of said housing adjacent said first end of said housing, a wall portion of said piston valve being recessed at a point intermediate its ends to provide a shoulder therein; spring means for biasing said piston valve to seating position against said internal shoulder; a starter valve in a valve body which extends into a valve chamber formed by wall means within the other end portion of said baffle structure which is adjacent said poppet valve and said second end of said housing; means for biasing said starter valve to a closed position; first conduit means, including said starter valve and a passageway connecting said piston chamber with a region within said housing between said internal shoulder and said first end of said housing, for providing communication via said piston chamber between said ends of said housing, said starter valve blocking said first conduit means until opened; means for opening said starter valve whereby said communication is established and said piston valve opens; and excess flow means without said housing, operatively connected to said region within said housing, said piston chamber, and a second region adjacent said second end and operable to stop fluid flow at a predetermined maximum pressure drop between said first and said second ends of said housing when fluid is flowing from said first end to said second end of said housing.

5. A fluid handling structure according to claim 4 wherein: a conduit is connected at one end to said housing at a point adjacent said valve seat and at the other end to said housing at a point between said internal shoulder and said first end of said housing; a venturi is disposed in said conduit; a check valve, operable to enable flow through said conduit from said one end to said other end only, is disposed in said conduit between said venturi and said one end of said conduit; and another conduit connects the throat of said venturi with said piston chamber.

6. A fluid handling structure according to claim 1 wherein said excess flow means comprises: a cylinder without and adjacent said housing, one end of said cylinder forming a portion of said conduit means; second conduit means, connected with, and enabling fluid flow from said region within said housing between said internal shoulder and said first end, through said cylinder, and into said piston chamber; a plug slidably disposed within said cylinder and in a first position blocking flow through said second conduit means; and means operable to release said plug from said first position to a second position blocking flow through said first conduit means and unblocking flow through said second conduit means, said plug releasing means being operable responsive to a predetermined maximum pressure in said second conduit means caused by said predetermined maximum pressure drop between said first and said second ends of said housing.

7. A fluid handling structure comprising: a tubular housing with a first end serving at least as an inlet and an opposite second end serving at least as an outlet, said ends being operable to be connected with fluid handling conduits; a valve seat at said second end of said housing; a poppet valve within said housing, supported by a baffle structure described hereinafter, and seatable in said valve seat; means for biasing said poppet valve to a closed position in said valve seat; an internal shoulder on the inner wall of said housing and adjacent said first end of said housing; said baffle structure being disposed longitudinally within said housing intermediate said valve seat and said internal shoulder so as to form an annular space between said housing and said baffle structure, one end portion of said baffle structure defining a piston chamber within said baffle structure and adjacent said internal shoulder and said first end of said housing; a fluid operated piston valve having a wall slidably engaged in said piston chamber, said piston valve being operable in one position to seat against said internal shoulder and stop flow of fluid through said housing; means for biasing said piston valve to said seating position against said internal shoulder; wall means defining a valve chamber within the other end portion of said baffle structure which is adjacent said valve seat and said second end of said housing, said wall means having a port therein for providing communication between said piston chamber and said valve chamber; a starter valve body extending from without said housing, through said annular space, and into said valve chamber; a starter valve in said valve body; means for biasing said starter valve to a closed position; means for opening said starter valve; conduit means, including said starter valve and a passageway connecting said piston chamber with a region within said housing between said internal shoulder and said first end of said housing, for providing communication via said piston chamber between said ends of said housing when said poppet valve and said starter valve are opened; and excess flow means without said housing, operatively connected to said region within said housing, said piston chamber, and a second region adjacent said second end and operable to stop fluid flow through said housing at a predetermined maximum pressure drop between said first and said second ends of said housing.

8. A fluid handling structure according to claim 7 wherein said excess flow means comprises: a cylinder without and adjacent said housing, one end of said cylinder forming a portion of said conduit means; a first conduit connecting an intermediate point of said cylinder with said piston chamber; a second conduit and a third conduit connecting said one end of said cylinder with said housing at a point adjacent said valve seat and with said valve body, respectively, and also forming additional portions of said conduit means; a fourth conduit connecting the other end of said cylinder with said housing at a point between said internal shoulder and said first end of said housing; a plug slidably disposed within said cylinder and in a first position blocking flow through said first and said fourth conduits and enabling flow through said second and said third conduits; and means operable to release said plug from said first position to a second position responsive to a predetermined maximum pressure in said fourth conduit, caused by said predetermined maximum pressure drop between said opposite ends of said housing, whereby flow through said second and said third conduits is blocked and flow through said fourth and said first conduit occurs.

9. A fluid handling structure according to claim 7 wherein: said wall of said piston valve is recessed at a point intermediate its ends to provide a shoulder therein.

10. A fluid handling structure according to claim 9 wherein: a fifth conduit is connected at one end to said housing at a point adjacent said valve seat and at the other end to said housing at a point between said internal shoulder and said first end of said housing; a venturi is disposed in said fifth conduit; a sixth conduit connects the throat of said venturi with said piston chamber; and a check valve, operable to enable flow through said fifth conduit from said one end to said other end only, is disposed in said fifth conduit between said venturi and said one end of said fifth conduit.

11. A fluid handling structure comprising: a tubular housing having a lower first end serving at least as an inlet and an opposite upper second end serving at least as an outlet, said ends being operable to be connected with fluid handling conduits; an inwardly facing valve seat at said upper second end of said housing; a mechanically operated poppet valve seatable in said valve seat, said poppet valve having a valve stem slidably supported in a guideway supported by a wall member described hereinafter; means for biasing said poppet valve to a closed position in said valve seat; an internal shoulder on the inner wall of said housing and adjacent said lower first end of said housing; a baffle structure disposed longitudinally within said housing intermediate said valve seat and said internal shoulder so as to form an annular space between said housing and said baffle structure; said wall member extending transversely of said baffle structure intermediate the ends thereof, said wall member together with one end portion of said baffle structure defining a piston chamber within said baffle structure and adjacent said internal shoulder; a piston valve having a wall slidably engaged in said piston chamber, said piston valve being operable in one position to seat against said shoulder and stop flow of fluid through said housing; means for biasing said piston valve to a closed position against said internal shoulder; wall means together with said wall member defining a valve chamber within the other end portion of said baffle structure which is adjacent said valve seat, said wall member having a port therein providing communication between said piston chamber and said valve chamber; a valve body extending from without said housing, through said annular space, and into said valve chamber; a starter valve in said valve body; conduit means, including said starter valve and a passageway connecting said piston chamber with a region within said housing between said internal shoulder and said first end of said housing, for providing communication via said piston chamber between said ends of said housing when said starter valve is opened; a cylinder without and adjacent said housing, one end of said cylinder forming a portion of said conduit means; a first conduit extending from an intermediate point in said cylinder to said piston chamber; a second conduit extending from one end of said cylinder to said housing at a point adjacent said valve seat and forming an additional portion of said conduit means; a third conduit extending from said one end of said cylinder to said valve body and also forming an additional portion of said conduit means; a fourth conduit extending from the other end of said cylinder to said housing at a point between said internal shoulder and said lower first end of said housing; a slidable plug within said cylinder operable in a first position to block flow through said first and said fourth conduits and allow flow through said second and said third conduits; means operable to release said plug from said first position responsive to a predetermined maximum pressure in said fourth conduit so as to block flow through said second and third conduits and unblock flow through said fourth and said first conduits; means for resetting said plug to said first position; means for opening said starter valve; and means for biasing closed said starter valve.

12. A fluid handling structure according to claim 11 wherein: said wall of said piston valve is recessed intermediate it sends to provide a shoulder therein.

13. A fluid handling structure according to claim 12 wherein: a fifth conduit is connected at one end to said housing at a point adjacent said valve seat and at the other end of said housing at a point between said internal shoulder and said lower first end of said housing; a venturi is disposed in said fifth conduit; a sixth conduit connects the throat of said venturi with said piston chamber; and a check valve, operable to enable flow through said fifth conduit from said one end to said other end only, is disposed in said fifth conduit between said venturi and said one end of said fifth conduit.

14. A fluid handling structure comprising: a tubular housing with a first end serving at least as an inlet and an opposite second end serving at least as an outlet, said ends being operable to be connected with fluid handling conduits; a baffle structure supported within said housing intermediate said ends so as to form an annular space between said baffle structure and said housing; a poppet valve supported by said baffle structure and seatable in a valve seat at said second end of said housing; a piston valve slidably engaged in a piston chamber formed within the end portion of said baffle structure which is adjacent said first end of said housing and seatable against an internal shoulder on the inner wall of said housing adjacent said first end of said housing, a wall portion of said piston valve being recessed at a point intermediate its ends to provide a shoulder thereon; a starter valve in a valve body which extends into a valve chamber formed by wall means within the other end portion of said baffle structure which is adjacent said poppet valve and said second end of said housing; means for biasing said starter valve to a closed position; first conduit means, including said starter valve and a passageway connecting said piston chamber with a region within said housing between said internal shoulder and said first end of said housing, for providing communication via said piston chamber between said ends of said housing, said starter valve blocking said first conduit means until opened; and means for opening said starter valve so as to provide said communication.

15. A fluid handling structure according to claim 14 wherein: a conduit is operatively connected at one end to said housing at a point adjacent said valve seat and at the other end to said housing at a point between said internal shoulder and said first end of said housing; a venturi is disposed in said conduit; a check valve, operable to enable flow through said conduit from said one end to said other end only, is disposed in said conduit between said venturi and said one end of said conduit; and another conduit connects the throat of said venturi with said piston chamber.

No references cited.

UNITED STATES PATENT OFFICE

CERTIFICATE OF CORRECTION

Patent No. 2,943,636

July 5, 1960

Edwin E. Reed et al.

It is hereby certified that error appears in the printed specification of the above numbered patent requiring correction and that the said Letters Patent should read as corrected below.

Column 8, line 13, for the claim reference numeral "7" read -- 8 --; column 9, line 15, for "it sends" read -- its ends --.

Signed and sealed this 10th day of January 1961.

(SEAL)
Attest:

KARL H. AXLINE
Attesting Officer

ROBERT C. WATSON
Commissioner of Patents